Feb. 11, 1969     C. A. DENNISON     3,426,770
APRON CONVEYOR TANK WIPER

Filed Feb. 16, 1967     Sheet 1 of 2

INVENTOR
CLIFFORD A. DENNISON
BY Petherbridge, O'Neill & Aubel.
ATTORNEYS

INVENTOR
CLIFFORD A. DENNISON
BY Petherbridge, O'Neill & Aubel.

ATTORNEYS.

United States Patent Office 3,426,770
Patented Feb. 11, 1969

3,426,770
APRON CONVEYOR TANK WIPER
Clifford A. Dennison, Itasca, Ill., assignor to Pemco, Inc., Hampshire, Ill., a corporation of Illinois
Filed Feb. 16, 1967, Ser. No. 616,628
U.S. Cl. 134—104                                9 Claims
Int. Cl. B65g 45/00

ABSTRACT OF THE DISCLOSURE

An articulated or segmented apron conveyor for carrying incinerated refuse through a water quench tank and to a remote point for collection and removal. Members are secured to the underside of the conveyor in spaced depending relationship in a manner which permits the members to continuously skim ash residue from the bottom of the quench tank during operation of the conveyor.

---

This invention relates to a conveyor system and to an apparatus for continuously cleaning the bottom of a tank in a system for conveying particles from a fluid. More particularly, the invention relates to a system and an apparatus for the prevention of particle accumulation in a liquid containing tank through which a conveyor passes.

In prior art conveying systems where a conveyor is moved through a liquid bath, such as water, and carries solid matter of varying particle sizes through the liquid, there is a tendency for small particles of the solid matter to sift through the conveyor and to accumulate in the bottom of the liquid containing tank beneath the conveyor. In time, such accumulations reach a sufficient magnitude both in volume and degree of compaction that they begin to effect the operation of the conveyor. Initially, a frictional drag is produced on the conveyor resulting in an increase in the horsepower required to operate the conveyor. Ultimately, the operation of the conveyor can become totally disrupted due to clogging of the conveyor when the accumulation becomes excessive.

The system of the invention employs an articulated or segmented apron conveyor for carrying incinerated refuse through a water quench bath and to a remote point for collection and removal. While apron conveyors have been used in the quarrying and mining industries for many years for moving stone and ore, such conveyors have not been used in garbage and refuse disposal applications. Apron conveyor systems are frequently referred to as leak-proof. While this may be the case where dry loads of rock or ore are being conveyed, this is definitely not the case when conveying the ash of incinerated garbage and other refuse through a water quench bath.

It has been found that the ash resulting from the incineration of refuse and garbage contains a high degree of minute particles or fines. As the ash particles are quenched in the water bath, these particles sink in the water of the bath onto the conveyor. The larger ash particles are retained on the conveyor, carried from the bath and are transported on the conveyor to a point of remote discharge and disposal. However, the smaller particles or fines descending through the water have a tendency to filter through the articulated apron conveyor and to become deposited upon the bottom of the quench tank. In a short while, the particle deposit on the quench tank bottom can reach proportions which will seriously affect the operation of the apron conveyor.

To overcome this tendency in conveyor systems carrying ash particles from a quench tank, an improvement has been made in such systems whereby the ash residue is continuously removed from the bottom of the quench tank. This is accomplished by securing members to the underside of the conveyor in spaced depending relationship in a manner which permits the members to continuously skim ash residue from the bottom of the quench tank during operation of the system. This residue is carried to a second smaller tank or receptacle spaced from the primary quench tank. A continuous stream of water is introduced into the second tank, and by a sluicing action, carries the ash residue therein through a conduit and back to the quench tank. The residue is returned to the quench tank near the end thereof from which the conveyor emerges.

Ordinarily, the members secured to the conveyor for skimming the bottom of the quench tank are flexible rubber wipers which frictionally engage the tank surface and carry any residue of particles or fines before them into the second tank as the conveyor proceeds in its normal operation. These wipers are secured to the underside of the conveyor in a manner such that they can be rather simply adjusted vertically between the conveyor and tank bottom and replaced when necessary. The number of members used has been found to depend on factors relating to the degree of residue accumulation in the bottom of the quench tank.

The apparatus of the invention, therefore, permits the use of segmented or articulated apron-type conveyors for carrying ash from incinerated refuse and garbage from a water quench tank and to a point of ultimate disposal. After the quenched ash is dumped from the conveyor, it is normally removed from the system by truck. Following discharge of the wet ash from the conveyor, the conveyor is cleaned by a brushing mechanism to remove any accumulation on the conveyor.

Various other objects and advantages of the invention will become more apparent from the following description of the drawings illustrating presently preferred embodiments hereof and wherein.

Figure 1:
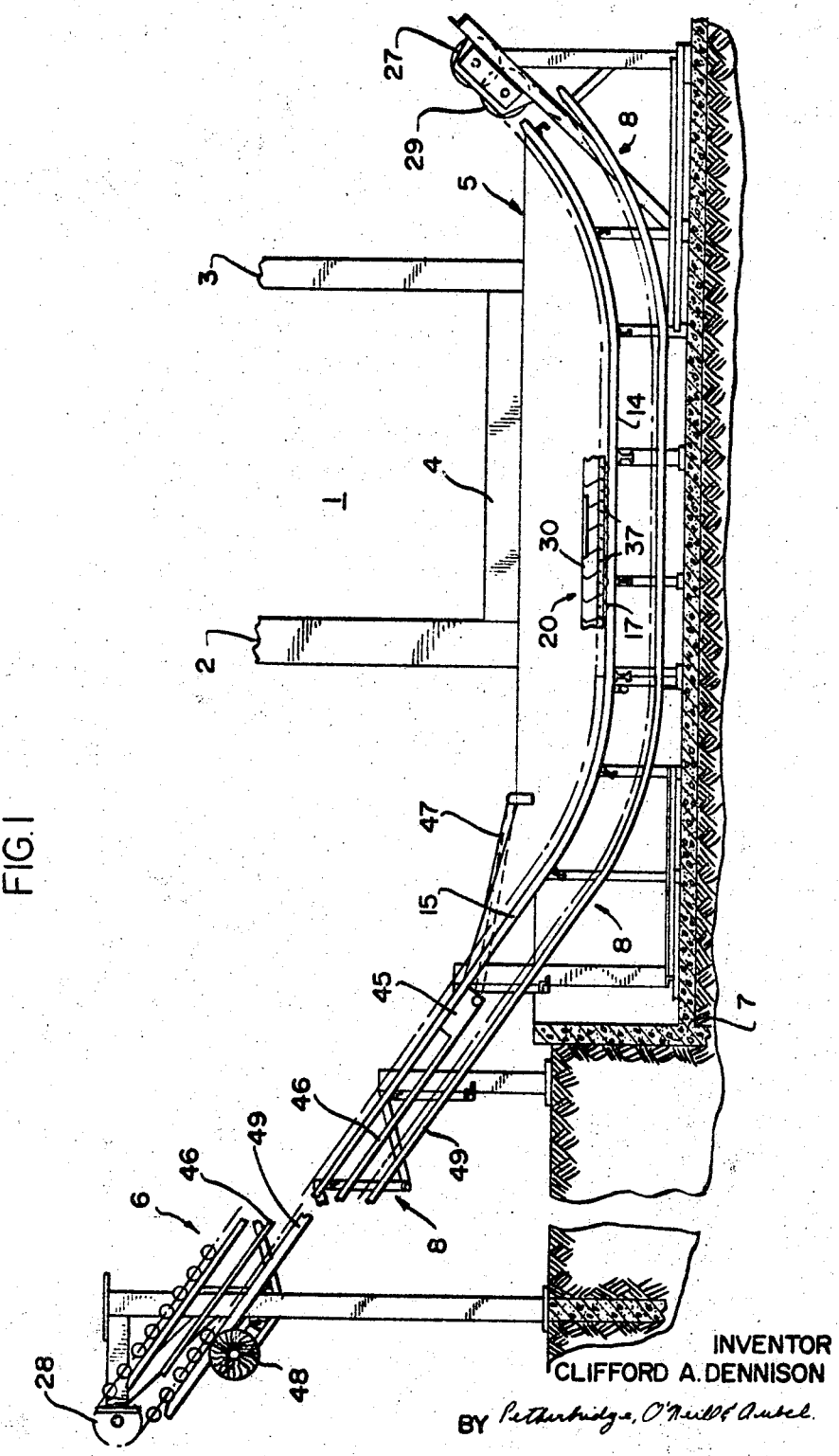
FIGURE 1 is a longitudinal sectional view of a refuse incineration and ash removal system of the invention.

FIG. 1 illustrates a conveyor system designed for use primarily in connection with the incineration and disposal of garbage and organic refuse. The drawing illustrates the exit end of an incineration chamber, generally designated 1, located between a pair of walls 2 and 3. Garbage or refuse is fed into the incineration chamber of the system at a remote point (not shown) and is exposed to intense heat as the matter is incinerated and moved through the chamber. Complete combustion or incineration of the matter is ordinarily achieved by the time it reaches discharge chute 4, which serves to discharge the ash remaining from the incineration process into a quench tank, generally designated 5, wherein the hot ash is cooled prior to final disposal.

This quench tank 5 and conveyor system, generally designated 6, are supported, as shown in FIG. 1, upon a foundation 7 and superstructure, generally designated 8. As can be best seen in FIG. 2, the quench tank is provided with a pair of L-shaped members 10 and 11 which are welded to the sides 12 and 13 and bottom of the tank 14 to provide a pair of spaced-aligned rails 15 and 16 which extend from one end of the tank to the other. These rails 15 and 16 are designed to support rollers such as 17 and 18, shown in FIG. 2, of a segmented or articulated apron conveyor, generally designated 20. This conveyor 20, as can best be seen in FIGS. 2 and 3, includes a bottom or pan portion 21 and upstanding left and right side portions 22 and 23, respectively, connected thereto. As is shown, the rollers 17 and 18 extend outwardly from the side portions 22 and 23 of the conveyor and are designed to roll along rails 15 and 16 within the confines of quench tank 5. These rollers are rotatably supported on an axle 24 shown in FIG. 3; but for purposes of clarity, the axle 24 is not shown in FIG. 2. For further clarity, the securement of axle 24 to the bottom or pan portion 21 of the conveyor has not been shown but is accomplished by means well known in the art. Inwardly of the rollers, chains 25 and 26 are connected to the axles 24 and are used to drive the conveyor by a drive sprocket 27 driven by suitable motive means (not shown).

Figure 3:
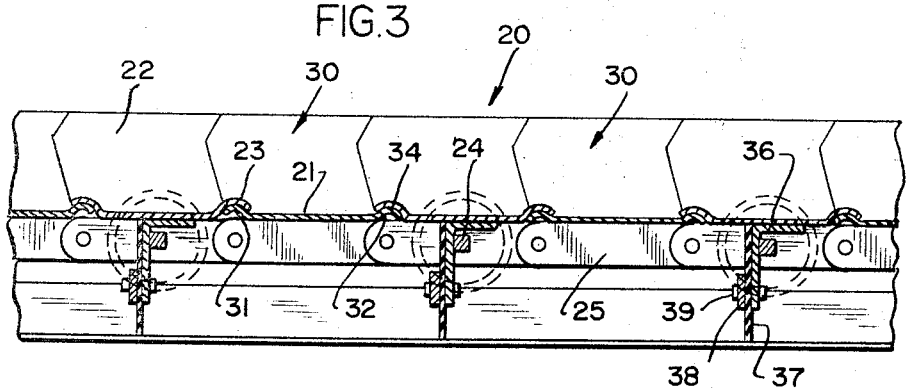
FIG. 3 is a side elevation of a portion of the apron conveyor of the invention.

As is shown in FIG. 1, and more clearly in FIG. 3, the side walls 22 and 23 of conveyor 20 are formed in a manner such that the walls of each segment 30 of the conveyor are disposed in overlapping relationship with each of the succeeding and preceding segments. The extent of overlap of the side walls of segments 30 in conveyors of the apron type is ordinarily made sufficient to maintain a complete side wall overlap as each segment is carried around a sprocket, such as sprockets 28 and 29 shown in FIG. 1 at opposite ends of the conveyor system 6. In this manner, the ash particles carried by the conveyor 20 are prevented from being prematurely discharged from spaces between sides of the conveyor segments 30 while they pass around a sprocket, such as 28, at the discharge end of the system.

To further enhance the particle retaining characteristics of the conveyor 20, the bottom or pan portions 21 of each of the segments 30 is positioned in overlapping relationship, as is illustrated in FIG. 3. Therefore, a pan portion 21 of a conveyor segment, as shown in FIG. 3, has a pair of rolled ends 31 and 32 which, in this instance, underlie overlying rolled edges 33 and 34 of adjacent bottom pan portions 21. The overlying relationship of bottom or pan portions 21 of each of the segments produces a substantially particle-tight movable joint which can be carried around both sprockets 28 and 29 without producing a separation between adjacent pans 21, and thereby prevents the premature and undesired discharge of particles from between the segments 30 during operation.

Figure 2:
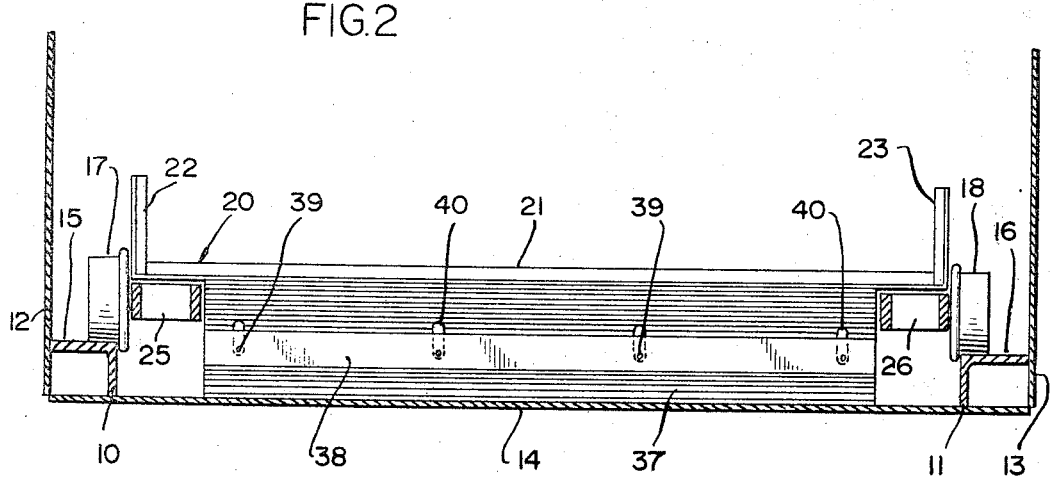
FIG. 2 is a cross-sectional view of the articulated conveyor and wiper of the invention.

Again, referring particularly to FIGS. 2 and 3, an L-shaped bracket 36 is secured to the under body of one of the pans 21 by welding or other common securement means. A flexible rubber wiping member 37 is connected to the L-shaped bracket by means of a horizontally extending pressure plate 38 which is bolted, utilizing bolts 39, to the L-shaped bracket with the bolts passing through the wiper member. To facilitate the vertical adjustment of the flexible rubber wiper member 37, upon initial installation and after periods of wear, the wiper member 37 is provided with perforated vertically extending apertures 40 which constitute extensions of the bolt openings through the member 37. Therefore, by utilizing the pressure plate 30 and bolts 39 securing the flexible rubber wiper member 37 between the pressure plate and L-shaped bracket, the member 37 can be adjusted vertically with respect to the bottom wall 14 of quench tank 5 or can be removed and replaced. As is shown in FIGS. 1 and 3, wiper members, such as 37, are provided at predetermined spaced intervals along the length of the segmented or articulated apron conveyor 20.

Referring again to FIG. 1, it can be seen that the conveyor 20 passes over sprocket 29, which is driven by drive sprocket 27, and into the water-filled quench tank 5. During the continuous operation of the system, refuse and garbage are continually being incinerated and passed in the form of ash particles onto discharge chute 4 and into the water bath where the particles are quenched. As the particles descend in the water of the bath, they are cooled and ultimately gravitate onto the conveyor 20.

It has been found, in the operation of the system of the invention, however, that very small ash particles or fines have a tendency to sift through the conveyor 20, even though due to the conveyor construction, the individual segments 30 of the conveyor provide an essentially sealed system. These fines have been found to rather quickly accumulate in the bottom 14 of tank 5. In a heavy duty and continuously operated system, therefore, the fines deposit in the bottom of the tank can develop into a very substantial accumulation in a short period of time. Initially, the accumulation will have little effect on the conveyor system; however, the residue build-up will eventually reach proportions sufficient to produce an accelerated power demand on the system as the conveyor develops a high degree of friction while it is dragged through the accumulation at the bottom of the tank. Ultimately, the accumulation can reach proportions which will totally disrupt the portion of the conveyor passing through the quench tank 5 and thereby disrupt the operation of the system.

By utilizing wiper members 37 secured at spaced intervals to the underside of the conveyor 20, the fines which sift through the conveyor and are ultimately deposited on the bottom wall 14 of the quench tank 5 are swept before the member 27 as the conveyor progresses through the tank and the residue is ultimately discharged from the tank. Since this is a continuous process, the ash, residue sifting through the conveyor is not permitted to develop an accumulation on the bottom wall portion 14 of the quench tank 5.

As the conveyor progresses through tank 5 on rails 15 and 16, it begins to emerge from the tank at a moderate angle, as shown in FIG. 1. The conveyor 20 continues up an inclined portion of tank 5 on rails 15 and 16, and wiper members 37 carry the fine residue along with the conveyor and up the inclined portion of the tank.

As can be best seen in FIG. 1, a receptacle or second tank 45 is located between the elements of the superstructure 8 of the conveyor system 6 just above the exit portion of quench tank 5. The receptacle 45 serves as a depository for the fines being swept in front of wiper member 37. As a conveyor segment 30 carrying a wiper member 37 passes over receptacle 45 on its travel along rails 15 and 16, the particle fines gravitate from the wiper member and into the receptacle 45.

Again referring to FIG. 1, a fluid supply conduit 46, which is supported on the superstructure 8 of the conveyor system, acts to continuously supply receptacle 45 with a generally uniform flow of water. The lowermost portion of receptacle 45 is provided with an outlet conduit 47 which establishes communication between the receptacle 45 and the portion of quench tank 5 adjacent the conveyor exit end thereof. Therefore, as fines are deposited in receptacle 45 by the wiper members 37 as conveyor segments pass over the receptacle, a continuous flow of water is washed or sluiced through the respectacle from supply conduit 46; and the fines and water are continuously discharged from the receptacle through outlet conduit 47. The water and fines returned to quench tank 5 from conduit 47 are returned to the tank, and thereby conveyor 20, at a point in the tank closely adjacent to the exit of the conveyor from the tank. In this manner, the great bulk of the collected fines are removed from the tank by the conveyor 20 with a minimum of return to the bottom of the tank. Any fines sifting through the conveyor segments 30 will be swept out of tank 5 and again returned to receptacle 45.

Following the discharge of the fines into receptacle 45, the conveyor 20 continues to ascend the conveyor system superstructure 8 on rails 15 and 16 until it reaches a predetermined height and turns about sprocket 28 discharging the contents of the conveyor in a free gravity fall to either a truck (not shown) or some other disposal facility. After the conveyor has passed sprocket 28, the interior thereof formed by side portions 22 and 23 and bottom or pan portion 21 is cleaned to remove all residue retained thereon by a rotary brush 48. The conveyor is then returned along a second set of rails 49 to driven sprocket 29 where the conveyor 21 is reintroduced into the water bath of quench tank 5.

Various modes of carrying out the invention are contemplated as being within the scope of the following claims particularly pointing out and distinctly claiming the subject matter which is regarded as the invention.

I claim:

1. A conveying system comprising a discharge means for discharging a particulate mass having varying particle sizes, means providing a fluid bath for receipt of the particulate mass from the discharge means, an endless conveyor having a portion thereof disposed in the fluid bath to catch and convey particles descending through the fluid of the bath, the conveyor including a plurality of segments each having a base portion and upstanding spaced side portions, the base and side portions of adjacent segments being disposed in overlapping relationship and maintaining such relationship throughout the travel of the conveyor, means on the conveyor extending in a direction opposite that of the upstanding side portions thereof for preventing the development of particulate residue accumulation in the fluid bath providing means, a receptacle is located opposite the exit end of the bath providing means and serves as a particle depository for particulate residue removed from the bath by the means on the conveyor for preventing residue accumulation in the bath providing means, the receptacle is provided with a fluid inlet to supply fluid thereto and is provided with a fluid outlet passage extending from the receptacle to the fluid bath providing means to return the particulate residue carried to the receptacle by the accumulation preventing means to the fluid bath and to the conveyor for disposal, and means for driving the conveyor.

2. The system of claim 1 wherein at any given time a portion of the conveyor enters at an entry end of the fluid bath providing means, a plurality of conveyor segments extend from this portion through the fluid bath and adjacent the bottom of the bath providing means to a portion of the conveyor exiting from the bath providing means at an exit end thereof, the remaining segments of the conveyor being disposed outside of the fluid bath.

3. The system of claim 1, wherein the means for preventing particulate residue accumulation in the fluid bath providing means comprises a plurality of flexible members connected to the side of the base portion of the conveyor opposite the upstanding side portions thereof at predetermined spaced intervals along the endless conveyor, each flexible member being connected to the base portion across substantially the width of the conveyor and in depending relationship with respect to the conveyor when in the fluid bath.

4. The system of claim 3, wherein the flexible members are removably and adjustably connected to the conveyor.

5. The system of claim 3, wherein the conveyor segments within the fluid bath are supported in spaced relationships with respect to the bottom of the fluid bath providing means and at least one of the segments in the fluid bath carries a flexible member depending therefrom and into particle residue wiping engagement with respect to the bottom of the bath providing means to prevent the development of a conveyor disrupting particle accumulation in the bath providing means.

6. The system of claim 1, wherein the endless conveyor is an apron conveyor, the particles are incinerated refuse, the bath providing means is a quench tank, the fluid is water, the means for driving the conveyor comprises a chain drive, the segments of the conveyor are carried on rollers which are mounted outside the upstanding side portions of the segments, the rollers are supported in the quench tank upon tracks, spaced flexible members are secured in depending relation to the underside of some of the segments between the rollers thereof in a manner producing a wiping action on the bottom of the quench tank, and a conveyor cleaning means is provided adjacent the conveyor discharge point.

7. In a system for conveying a mass of particles of varying sizes through a liquid wherein the conveyor of the system permits some particle sizes to sift therethrough, a tank for containing a liquid, a conveyor having a portion thereof in the tank, at least one flexible member connected substantially across the width of the conveyor and disposed in wiping contact with the bottom of the tank to remove particle accumulations, resulting from the sifting of particles through the conveyor, from the tank when the member passes through the tank, a receptacle is spaced from the tank and serves as a depository for particles carried from the tank by the flexible member, a liquid inlet for the receptacle and a liquid outlet passage connecting the receptacle with the tank to return particles deposited in the receptacle by the flexible member to the tank and conveyor for carriage to a remote point, and means for driving the conveyor.

8. The system of claim 7, wherein the conveyor is an endless articulated conveyor.

9. The system of claim 7, wherein a plurality of flexible members are secured across the underside of the conveyor in removable and adjustable relationship therewith and at predetermined spaced intervals therealong.

References Cited

UNITED STATES PATENTS

| 694,372 | 3/1902 | Goetz | 134—104 |
|---|---|---|---|
| 1,144,023 | 6/1915 | Beutlich | 134—104 |
| 1,452,844 | 4/1923 | Ogburn | 134—104 |
| 3,028,962 | 4/1962 | Davis | 209—172.5 |

FOREIGN PATENTS 504,635 4/1939 Great Britain.

ROBERT L. BLEUTGE, *Primary Examiner.*

U.S. Cl. X.R.

134—109